United States Patent [19]

Allain et al.

[11] 4,202,728
[45] May 13, 1980

[54] DOUBLE-ARM HANDLING DEVICE FOR A NUCLEAR REACTOR

[75] Inventors: Albert Allain, Bruyeres-le-Chatel; Jacqui Buret, Saulx-les-Chartreux, both of France

[73] Assignee: Commissariat a l'Energie Atomique, Paris, France

[21] Appl. No.: 838,476

[22] Filed: Oct. 3, 1977

[30] Foreign Application Priority Data

Oct. 15, 1976 [FR] France ................. 76 31059

[51] Int. Cl.² .............. G21C 19/20; B66C 17/08; B66C 1/10
[52] U.S. Cl. ................. 176/30; 294/86 A; 414/146
[58] Field of Search ............. 176/30, 31, 32; 214/18N; 294/86 A

[56] References Cited

U.S. PATENT DOCUMENTS

| | | | |
|---|---|---|---|
| 3,773,616 | 11/1973 | Aubert | 176/30 |
| 3,909,350 | 9/1975 | Dupuy | 176/30 |
| 3,915,792 | 10/1975 | Aubert | 176/30 |
| 3,997,393 | 12/1976 | Allain | 176/30 |
| 4,069,098 | 1/1978 | Wade | 176/30 |

Primary Examiner—Charles T. Jordan
Assistant Examiner—Donald P. Walsh

[57] ABSTRACT

Two carriages which can be displaced independently of each other in vertical translational motion are guided by means of slideways secured to a rotatable vertical body, the upper end of which passes through the rotating shield plug of the reactor. Each carriage has a horizontal arm and grab for handling fuel assemblies, the arms being maintained parallel to each other.

2 Claims, 9 Drawing Figures

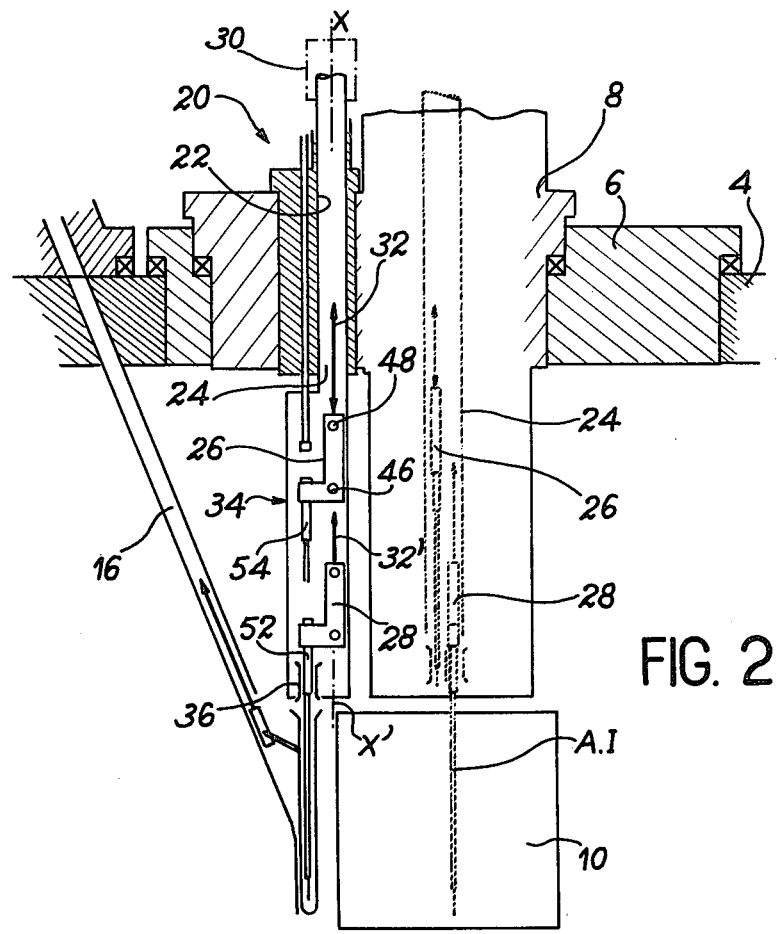
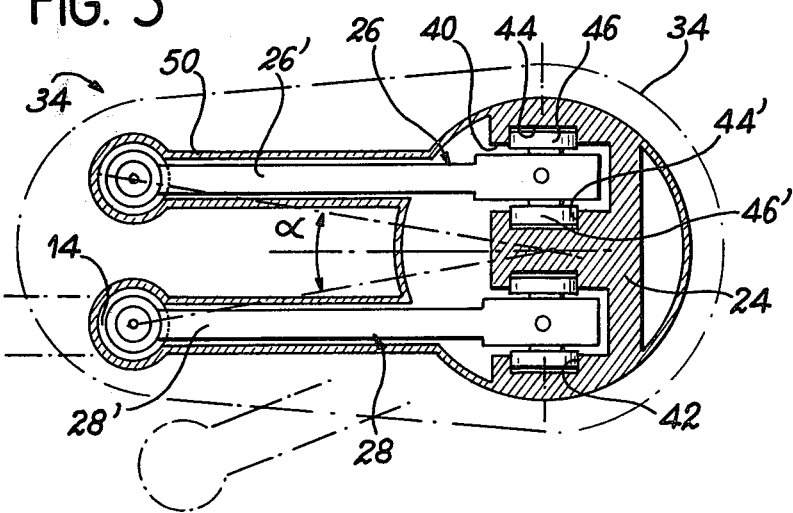

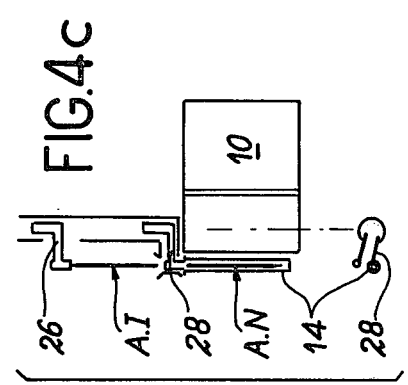
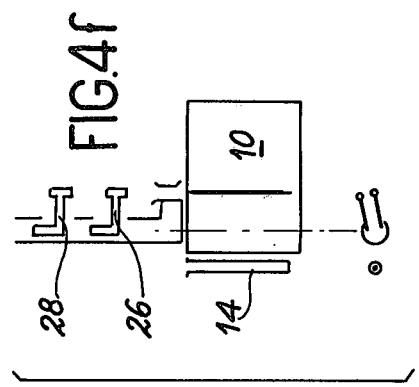
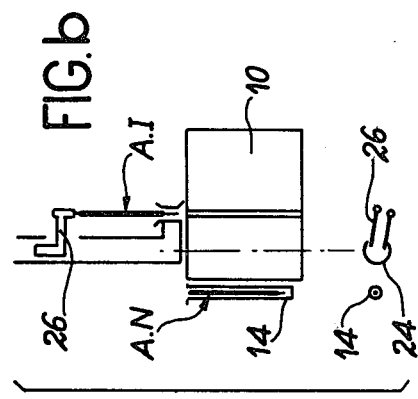
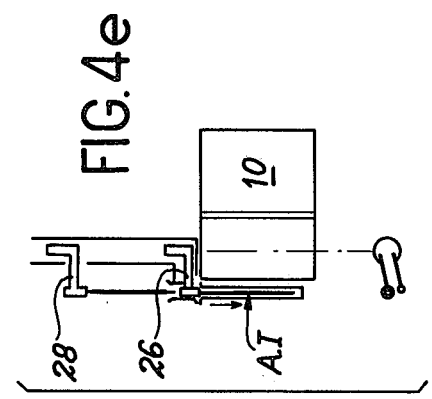
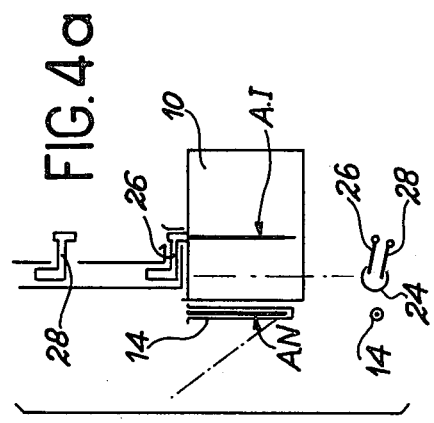
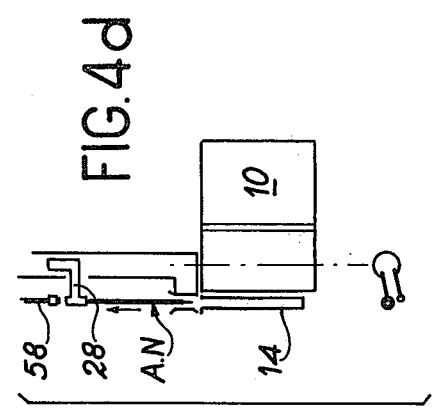

DOUBLE-ARM HANDLING DEVICE FOR A NUCLEAR REACTOR

The present invention is concerned with a double-arm handling device for a nuclear reactor.

In more precise terms, this invention relates to a machine for transferring the fuel assemblies which constitute the core of a nuclear reactor and especially a liquid-sodium cooled reactor, said assemblies being intended to be transferred within the pressure vessel between positions occupied by these latter within the reactor core and a position of storage within the pressure vessel. This storage position constitutes an intermediate location prior to discharge of irradiated fuel assemblies, for example to a storage pond outside the pressure vessel. It is readily apparent that these operations are performed when the shield plug of the reactor is in position and when the vessel is filled with liquid sodium, that is to say under conditions of zero visibility.

It is known that these handling operations are more specifically concerned on the one hand with the removal of irradiated fuel assemblies from the reactor core and subsequent storage in a cooling pond and conversely with the replacement of these irradiated fuel assemblies by fresh assemblies which are intended to be positioned within the reactor core. Handling operations can also consist in moving a fuel assembly from one location to another within the core.

In order to gain a clearer understanding of the problem to be solved, reference will advantageously be made to FIG. 1 of the accompanying drawings. This figure is a vertical sectional view of one-half of the primary vessel of a liquid-sodium cooled fast reactor.

In accordance with the conventional arrangements shown, provision is made for a primary vessel 2 suspended from a reactor vault roof or top shield slab 4 which is closed by means of two rotating shield plugs designated respectively by the reference numerals 6 and 8. The axis of the large rotating shield plug 6 coincides with the axis X-X' of the pressure vessel whereas the small rotating shield plug 8 is mounted eccentrically with respect to this latter and its axis Y-Y' is therefore displaced with respect to the axis of the pressure vessel which is also the axis of the reactor core 10. In this conventional type of fast reactor, the transfer of spent fuel assemblies from the reactor core to a storage pond and the replacement of these latter by fresh assemblies is carried out by means of two machines. Provision is made on the one hand for a charge-discharge machine 12 which is securely mounted on the small rotating shield plug 8 and serves to displace either fresh or spent fuel assemblies between the reactor core and a handling flask 14. Said flask is designed to receive a spent fuel assembly or to permit withdrawal of a fresh fuel assembly which has just been brought to the flask. Furthermore, the removal of the spent fuel assembly or the introduction of the fresh assembly in the handling flask 14 is carried out by means of the refuelling machine 16.

The sole aspect which will be dealt with in the following description is the problem of handling within the pressure vessel, namely the problem of transfer of fuel assemblies between the reactor core 10 and the handling flask 14 by means of the charge-discharge machine 12. It is understood that, by virtue of the eccentric position of the small shield plug and the eccentric position of the charge-discharge machine 12 with respect to said small shield plug, the lower end 12' of the machine (namely a grab or grappling member) is capable of moving above all the fuel assemblies of the reactor core 10 and above the handling flask 14. Furthermore, the change-discharge machine 12 can have a possibility of rotational displacement of its end portion 12' with respect to the axis of the vertical body which constitutes the charge-discharge machine 12.

If consideration is given to the complete sequence of replacement of a spent fuel assembly by a fresh fuel assembly in accordance with the mode of operation shown in FIG. 1, it is clearly necessary in the first place to move the charge-discharge machine in order to bring this latter into position above the spent fuel assembly, then to extract this fuel assembly, bring it into position above the handling flask 14 and introduce it into the flask. The spent fuel assembly is then replaced by a fresh assembly within the handling flask. The fresh assembly is gripped by means of the charge-discharge machine and positioned within the reactor core in place of the spent assembly.

It is apparent that the use of a charge-discharge system of this type involves relatively long dead times, especially the time required to discharge the spent fuel assembly from the handling flask 14 to the exterior and to replace it by a fresh assembly. Furthermore, these different operations call for extremely accurate positioning of the charge-discharge machine with respect to a predetermined core position corresponding to the fuel assembly to be changed and also with respect to the handling flask 14, the positioning of which can change to a slight extent at the time of the operation which consists in replacing the spent assembly by the fresh assembly.

The precise aim of the present invention is to provide an improved charge-discharge device which makes it possible to reduce the handling time to a minimum and also to reduce the number of operations involved in positioning the handling device within the reactor vessel in order to carry out the different charging and discharging operations.

It is self-evident that these operations take place after shutdown of the reactor and therefore that they should preferably take the shortest possible time in order to minimize reactor outage.

The invention is precisely directed to a handling device for a nuclear reactor of the type comprising within a pressure vessel closed by a top shield slab provided with at least one rotating shield plug, a reactor core constituted by a plurality of fuel assemblies and a handling flask. The handling device essentially comprises:

a body which has a vertical axis and the upper end of which passes through said shield plug,
   a first carriage guided in vertical translational motion by first guiding means rigidly fixed to said body, a second carriage guided in vertical translational motion by second guiding means rigidly fixed to said body, each carriage being provided with a horizontal arm at the free end of which is placed a grab for gripping said fuel assemblies, the guiding means being such that said arms remain parallel to each other,
   means for displacing said carriages in vertical motion independently of each other,
   means for controlling the opening and closure of said grabs,
   means for driving said body in rotation about the vertical axis thereof.

Preferably, the means for guiding a carriage consist of a slideway in which the carriage is capable of moving and two grooves formed in the two opposite faces of said slideway and adapted to cooperate with rollers attached to said carriage.

A more complete understanding of the invention will in any case be obtained from the following description of one embodiment of the invention which is given by way of example without any limitation being implied, reference being made to the accompanying drawings, wherein:

FIG. 1 as described earlier is a vertical sectional half-view of the pressure vessel of a fast reactor provided with a charge-discharge device in accordance with the prior art;

FIG. 2 is a vertical sectional view of a portion of the pressure vessel showing the double-arm charge-discharge device in accordance with the invention;

FIG. 3 is a horizontal sectional view of the device showing the two parallel arms;

Figure 1:
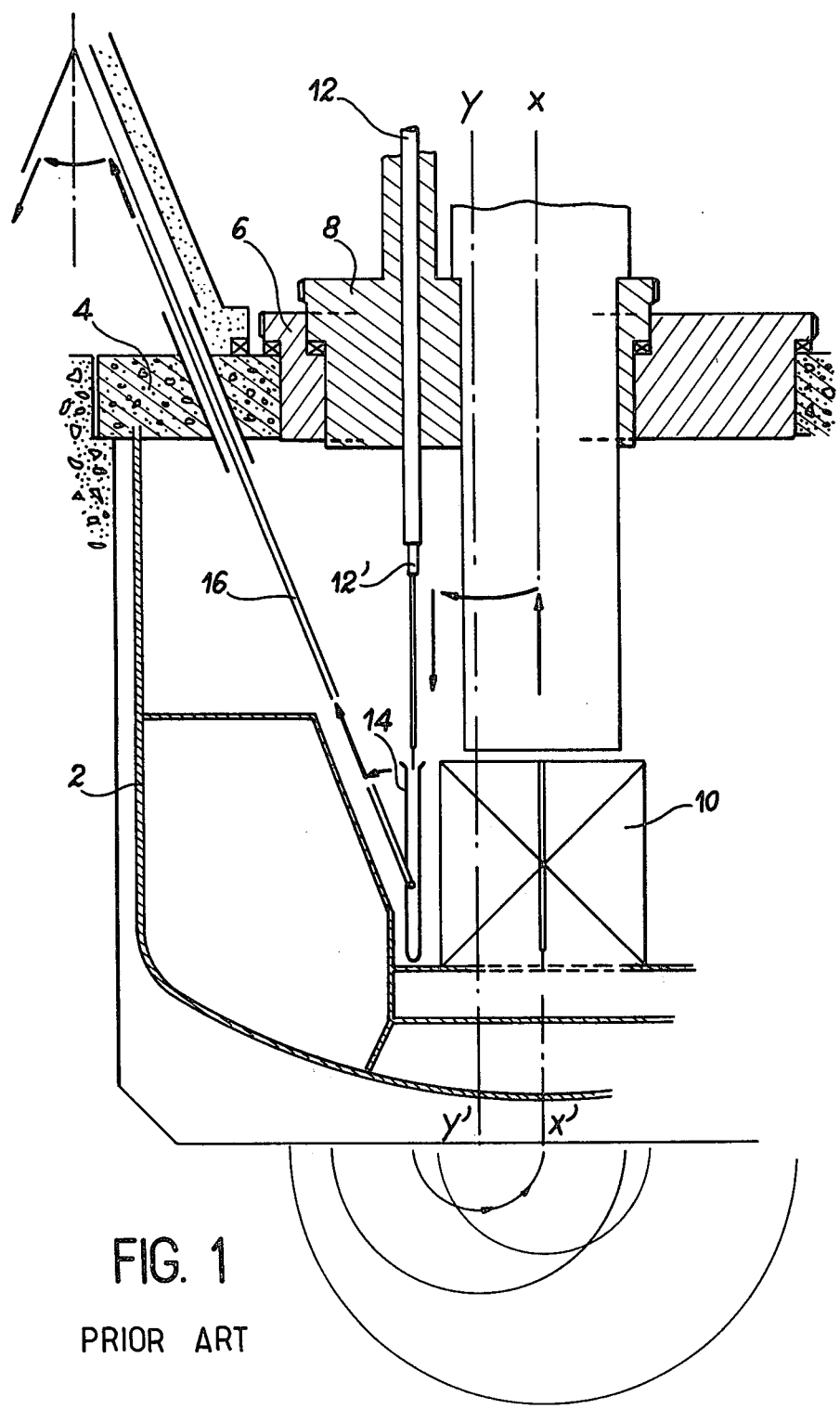

FIG. 4 consists of synoptic diagrams showing the different stages of an operation which involves replacement of fuel assemblies.

As mentioned in the foregoing, the device for handling fuel assemblies is essentially distinguished by the fact that two parallel handling arms are provided on a single vertical column, each arm being fitted with a handling grab. Said arms are capable of moving independently in the vertical direction and at the same time of moving in rotation about a vertical axis.

There are again shown in FIG. 2 the top shield slab 4, the large rotating shield plug 6 and the small rotating shield plug 8. It would also be possible to provide only a single rotating shield plug. The handling device in accordance with the invention as generally designated by the reference numeral 20 is introduced into a bore 22 of the small rotating shield plug. The handling device essentially comprises a vertical body 24 which is capable of pivoting about its vertical axis x-x'. Two moving systems designated respectively by the reference numerals 26 and 28 and hereinafter referred-to as carriages are mounted on said vertical body 24. The carriage 26 comprises a horizontal arm 26' fitted with a vertical grab for gripping the handling heads of fuel assemblies. There is shown very diagrammatically at 30 a mechanism which is fixed on the small rotating shield plug and serves to produce movements of rotation of the body 24 about the vertical axis of this latter. In more precise terms, said mechanism can consist of a system of pinions disposed in meshing engagement with a gear system which surrounds the top portion of the body 24. The mechanism is driven by a two-speed electric motor. Positional control of each arm is ensured by two circular verniers provided with scales displaced through an angle α. Reading of the position is effected by means of a camera which is focused on each of the two verniers in alternate succession. The moving systems represented by arrows and designated by the references 32 and 32' serve to displace the moving carriages 26 and 28 independently in the vertical direction, the range of travel being limited by end-of-travel contacts. Finally, the arms 26' and 28' are capable of moving within a column 34 which is rigidly fixed to the body 24. Provision is made for two guide sleeves at the lower end of said body. Only the guide sleeve 36 corresponding to the carriage 28 is illustrated in the figure.

In FIG. 2, there is shown in dashed outline a front view of the device in a position of gripping of the irradiated fuel assembly A.I. of the reactor core 10.

Referring now to FIG. 3, the mode of construction of the handling device will be described in greater detail. Each carriage 26 and 28 is guided in vertical translational motion within the column 34 by means of two slideways designated respectively by the reference numerals 40 and 42. In the case of each arm, the slideway is provided internally with two grooves 44 and 44' (in the case of the slideway 40) in which rollers 46 and 46' in the case of the carriage 26 are capable of moving. In fact, each carriage provided with two series of two rollers as shown in FIG. 2. For example, the arm 26' is provided with the rollers 46 and 46' and with the rollers 48 and 48' above these latter. As can readily be understood, exactly the same sets of rollers are provided in the case of the guiding arm 28': both arms are contained within a casing 50 which is rigidly fixed to the body 24 and has two extensions. These two casing extensions are of course intended to permit vertical displacements of the arms. Provision is made within the arms 26' and 28' for rods which serve to control the opening and closure of the grabs shown diagrammatically in FIG. 2 and designated by the reference numerals 52 and 54. The mechanisms for controlling the opening and closure of said grabs for gripping the heads of fuel assemblies are identical with those described in French Pat. No. 1,563,044 filed on Feb. 15, 1968 in the name of the present Applicant in respect of "Handling member for nuclear reactor fuel elements".

In FIGS. 4a, to 4f, there are shown diagrammatically the different stages corresponding to transfer of an irradiated fuel assembly which has been withdrawn from the reactor core and to replacement of said assembly by a fresh assembly. In the following description, the irradiated assembly will be designated as A.I. and the fresh assembly will be designated as A.N. In other words, the handling device makes it necessary to grip the irradiated fuel assembly and take this latter from the reactor core, to place said irradiated assembly within the handling flask 14, to take the fresh assembly and replace this latter within the reactor core in the position previously occupied by an irradiated assembly.

It is readily apparent that the two arms 26' and 28' mounted on the moving carriages 26 and 28 have exactly the same length. It is readily apparent that guiding of the moving carriage within the column is extremely accurate in order to obtain good positioning of the handling grabs above the fuel assemblies. Moveover, the summit angle α made by the two grabs of the arms in a horizontal plane coincides with the vertical axis of the body.

In a first stage shown in FIG. 4a, the carriage 26 is brought in the line of extension of the irradiated fuel assembly A.I., the carriage 26 and the arm 26' are moved downwards and the irradiated fuel assembly is gripped by means of the corresponding grab whilst the arm 28' remains in the top position. In FIG. 4b, the carriage 26 which carries the irradiated fuel assembly is brought back to the top position. In FIG. 4c, the arm which is free is brought into position above the handling flask 14 and said arm 28' is lowered. The corresponding grab grips the fresh fuel assembly A.N. which is placed within the flask. In FIG. 4d, the arm 28' is moved upwards in order to extract the fresh fuel assembly from the handling flask 14 and the fresh assembly is pre-oriented by means of the pre-orientation device 58. This pre-orientation device 58 is of the type described in French Pat. No. 71 43236 filed on Dec. 2, 1971. By means of this device, the fuel assembly can be caused to pivot about its longitudinal axis. A movement of rotation of the device as a whole is then carried out through an angle $\alpha$, with the result that the arm 26' which supports the irradiated assembly is brought above the handling flask 14 without any further positioning problem. The irradiated fuel assembly is pre-oriented by means of the same device 58. The irradiated assembly is moved downwards into the handling flask 14 (FIG. 4e), whereupon the arm 26' is moved upwards. By displacing the rotating shield plugs in pivotal motion, the charge-discharge device whose arm 28' then supports the fresh fuel assembly is brought into position above the reactor core to the same location as the irradiated fuel assembly which had previously been withdrawn. The fresh fuel assembly is deposited by lowering the carriage 28 and the arm 28' is returned to the top position (the fresh assembly having previously been pre-oriented).

It is clearly apparent from the detailed description of the different stages that this particular structure of the handling device makes it possible to dispense with a large number of operations compared with those which would be required by a charge-discharge device of conventional type. Furthermore, the operations involved in positioning the charging arm above the reactor core or above the handling flaks are greatly facilitated or at least are appreciably reduced since the second arm is immediately positioned once a carriage of the charge-discharge device has been positioned by rotating the entire device through an angle $\alpha$. It is also worthy of note that, in comparison with a design comprising two independent arms, any danger of interference between the two arms is avoided at the time of independent operation since said arms in fact remain continuously parallel to each other.

What we claim is:

1. A handling device for a nuclear reactor of the type comprising within a pressure vessel closed by a top shield slab provided with at least one rotating shield plug, a reactor core constituted by a plurality of fuel assemblies and a handling flask for receiving a fuel assembly, wherein said device comprises:

a vertical body having a vertical axis, the upper end of said body passing through said shield plug, and means for driving said body in rotation about said axis with respect to said shield plug, a first carriage provided with a first horizontal arm, the free end of which is provided with a first grab adapted to open and close for gripping said fuel assemblies, a first guiding means rigidly fixed to said body and adapted to guide said first carriage in vertical translational motion so that the first horizontal arm of said first carriage is movable in a first vertical plane, a second carriage provided with a second horizontal arm, the free end of which is provided with a second grap adapted to open and close for gripping said fuel assemblies, a second guiding means rigidly fixed to said body and adapted to guide said second carriage in vertical translational motion so that the second horizontal arm of said second carriage is movable in a second vertical plane distinct from the first vertical plane, and so that said second arm remains parallel to said first arm, and means for controlling independently the opening and closing of said grabs.

2. A handling device according to claim 1, wherein said means for guiding said first and second carriages respectively comprise a slideway in which the respective carriage is capable of moving, rollers attached to said first and second carriages, each slideway having two opposite faces, and two grooves formed in said opposite faces of the respective slideway and adapted to cooperate with the rollers attached to the respective carriage.

* * * * *